United States Patent [19]

Nakajima et al.

[11] Patent Number: 4,819,502

[45] Date of Patent: Apr. 11, 1989

[54] FLYWHEEL DEVICE

[75] Inventors: Toshio Nakajima; Hiroshi Kumatani, both of Aichi; Masayuki Miyazaki, Hyogo; Kazuo Tezuka, Aichi, all of Japan

[73] Assignee: Mitsubishi Denki Kabushiki Kaisha, Tokyo, Japan

[21] Appl. No.: 924,552

[22] Filed: Oct. 29, 1986

[30] Foreign Application Priority Data

Oct. 31, 1985 [JP] Japan ............................. 60-244598
Oct. 31, 1985 [JP] Japan ............................. 60-244604
Oct. 31, 1985 [JP] Japan ............................. 60-244605
Oct. 31, 1985 [JP] Japan ............................. 60-244606

[51] Int. Cl.⁴ ........................... G05G 1/00; H02K 1/22
[52] U.S. Cl. ..................................... 74/572; 310/266; 310/261; 74/574
[58] Field of Search ............... 74/572, 574, 5.46; 310/261, 67 R, 42, 266; 72/327; 148/145

[56] References Cited

U.S. PATENT DOCUMENTS

| | | | |
|---|---|---|---|
| 4,259,604 | 3/1981 | Aoki | 310/266 |
| 4,295,068 | 10/1981 | Gamble | 310/261 |
| 4,295,069 | 10/1981 | Givan et al. | 310/261 |
| 4,306,166 | 12/1981 | Quandt | 310/266 |
| 4,327,479 | 5/1982 | Futterer et al. | 310/266 |
| 4,337,406 | 6/1982 | Binder | 310/266 |
| 4,429,245 | 1/1984 | Muller et al. | 310/261 |
| 4,467,230 | 8/1984 | Rovinsky | 310/266 |
| 4,529,900 | 7/1985 | Uzuka | 310/266 |
| 4,562,367 | 12/1985 | Kumatani | 310/266 |
| 4,611,139 | 9/1986 | Godkin et al. | 310/266 |

FOREIGN PATENT DOCUMENTS

| | | | |
|---|---|---|---|
| 1144784 | 4/1983 | Canada | 74/572 |
| 0069568 | 1/1983 | European Pat. Off. | 74/572 |
| 0221495 | 5/1987 | European Pat. Off. | 74/572 |
| 3209976 | 9/1982 | Fed. Rep. of Germany | 310/261 |
| 60-111365 | 7/1985 | Japan | 310/266 |
| 60-210134 | 10/1985 | Japan | 310/266 |
| 60-216734 | 10/1985 | Japan | 310/266 |
| 60-216737 | 10/1985 | Japan | 310/266 |

Primary Examiner—Richard E. Moore
Assistant Examiner—Vinh Luong
Attorney, Agent, or Firm—Bernard, Rothwell & Brown

[57] ABSTRACT

A flywheel device in which a rotating body is rotatably supported within a casing, the rotating body comprising a rotor rotated at a high speed and a flywheel rotated integrally with the rotor to accumulate rotating energies capable of being converted into electric energies at a time of a power failure. A protective ring is provided beween the outer surface of the rotating body and the inner circumferential wall of the casing. Upon the occurrence of an abnormally high speed of the rotating body, the rotor of the rotating body engages the protective ring. The protective ring is free of fixed engagement with the casing so that when engaged by the rotor the weight of the protective ring is added to that of the rotating body to act as a braking force.

16 Claims, 5 Drawing Sheets

FLYWHEEL DEVICE

BACKGROUND OF THE INVENTION

1. Field of the Invention

This invention relates to a flywheel device applied, for example, to an uninterruptible power source device for a computer, etc., and more specifically, to a flywheel provided with an absorbing mechanism for absorbing rotating inertia energy of a flywheel rotor when the rotor rotating at a high speed malfunctions.

2. Description of the Prior Art

With the recent progress of electronic technology of computers and the like, uninterruptible power source devices provided with a battery or the like have been developed. One example so far proposed is a flywheel power source device or the like which utilizes a rotating inertia force of a flywheel to supply power to a load of a computer or the like, as a generator, when a momentary power failure occurs.

In a flywheel power source device applied to the aforesaid power source device or the like, as shown in FIG. 1, a casing 1 comprising a frame base 1a and a cover 1b interiorly supports a rotating shaft 3 of a rotary body 20 so that the shaft 3 may be rotated at a high speed, the rotary body 2 being composed of a flywheel 2a at the pper side thereof and a rotor 2b integrally formed at the lower side of the flywheel 2a. The rotating shaft 3 comprises a lower portion which consists of a spiral shaft 3a having a spherical surface at the lower portion thereof carried on a lower bearing 4 composed of a stationary portion 4a and a bearing portion 4b provided on the base 1a, and an upper portion which consists of an upper rotating shaft 3b carried on an upper bearing 5 provided on the cover 1b. A rotor magnet 6 is secured to the inner peripheral portion of the rotor 2b, and a stator 7 is provided oppositely of the rotor magnet 6 and in the outer periphery of a stationary portion 4a of the lower bearing 4. This stator 7 comprises a stationary core 7a and a stationary coil 7b.

WIth the arrangement as described above, the flywheel device normally acts as an electric motor so that when a voltage is applied from an external power source to coil 7b of the stator 7, the rotary body 2 comprising rotor 2b and flywheel 2a is rotated at a high speed in one or the other direction by means of an electromagnetic force produced in the rotor magnet 6 to store rotating energy. On the other hand, when the external power source device malfunctions, for example, an interruption of electric service occurs, the flywheel device acts as a generator so that power is supplied, for example, to a load of a computer or the like by the stator 7 according to the rotating energy stored in the rotor 2b of the rotary body 2, and the device is used as an interruption compensator. Accordingly, the flywheel needs to store a sufficient energy to cope with generation of an abnormal state of the power source. Therefore the rotor 2b rotates at a high speed.

However, according to the flywheel device constructed as described above, when the rotor 2b rotates at an abnormally high speed due to a malfunctions of for example a control device, the flywheel receives an abnormal centrifugal force and spreads in an outer peripheral direction. This causes the flywheel to come into contact with the cover 1b of the casing 1 or the like while being rotated at a high speed. This leads to problems such as occurrence of trouble internally of the device or breakage of parts in the device.

To eliminate these problems, a flywheel device as shown in FIG. 2 has been proposed. In FIG. 2, parts indicated by numerals 1 to 7 correspond to those of FIG. 1, description of which is therefore omitted. At a position opposed to the outer periheral surface of the rotor 2b in the inner peripheral surface of the cover 1b of the casing 1 is secured a protective ring 8 by means of a fixing means such as screws 9 ... with a gap G provided thereat, and a temperature sensor 10 is provided on the protective ring 8.

With the arrangement as described above, during the normal operation, the rotor 2b rotating at a high speed maintains substantially a uniform gap G relative to the inner peripheral surface of the protective ring 8. However, in the case where the rotation of the rotor 2b is a malfunctions and a deformation not less than the predetermined gap G occurs, the outer peripheral portion of the rotor 2b comes into contact with the inner peripheral portion of the protective ring 8. This contact-friction causes a braking force to act on the abnormal high speed rotation of the rotor 2b. Furthermore, frictional heat produced when the outer peripheral portion of the rotor 2b contacts the inner peripheral portion of the protective ring 8 is detected by the temperature sensor 10. When the value detected by the sensor 10 exceeds a reference value, the controller (not shown) actuates to cut off the power source to stop supply of power to the flywheel device to control the motor. The rotor 2b is controlled to be rotated at a low speed so as not to produce a breakage, damage or the like within the flywheel device.

However, the conventional flywheel device provided with the protective ring as mentioned above also has the following problems.

First, in the event that the rotor 2b at the lower side of the rotating body 2 is spread due to the centrifugal force resulting from the abnormal high speed rotation and comes into contact with the inner peripheral surface of the protective ring 8 with a great contact force, the outer peripheral portion of the spread rotor 2b partially strongly impinges upon the inner peripheral surface of the protective ring 8 or cuts thereinto. As a result, the protective ring 8 receives the action of the rotating energy of the rotating body 2 and tends to rotate. Therefore, a fixing portion between the inner peripheral surface of the cover 1b and the protective ring 8, for example, screws 9, a mounting hole, etc. are broken, which leads to a looseness or a play in mounting state of the protective ring 8 and failure to brake the rotating body.

Since in prior art, the rotational speed of the rotating body 2 has been controlled by sliding frictional heat between the rotor 1b and the protective ring 8, it is necessary to convert a detection signal of the temperature sensor 10 into a control signal or the like by means of a controller (not shown) or the like. Another problem has been encountered in that the circuit construction of the controller becomes complicated resulting in frequent troubles and complexity of maintenance and repair.

SUMMARY OF THE INVENTION

It is a principal object of the invention is to provide a flywheel device in which a protective ring is rotated following a turning force of a rotor when the rotor comes into contact with the protective ring with a great contact force thereby preventing a breakage of a fixed portion of the protective ring and imparting an effective braking force to the rotating body.

It is a further object of the invention to provide a flywheel provided with a controller which is simple in circuit construction and quickly effects controlling operation in response to the occurrence of abnormal condition, by the provision of an abnormal-condition detecting sensor in the protective ring.

For achieving the aforesaid objects, a flywheel device according to the present invention comprises a protective ring provided at a position opposed to the outer peripheral portion of the rotor in the inner peripheral surface of a casing, the protective ring following rotation and contact motion of the rotor for rotation thereof, and relieving a turning force of a rotating body comprising a rotor when the rotating rotor comes into contact therewith with a force not less than a predetermined contact force. Moreover, this protective ring is locked during the period of receiving the action of a turning force less than a predetermined value from the rotor and maintains a temporarily locked state. The protective ring is released from its temporarily locked state when the action of the turning force exceeds a predetermined value and then rotated, thereby more effectively relieving the abnormal high speed rotation of the rotating body.

DETAILED DESCRIPTION OF THE PREFERRED EMBODIMENTS

Several of preferred embodiments of a flywheel according to the present invention will be described in detail.

Figure 1:
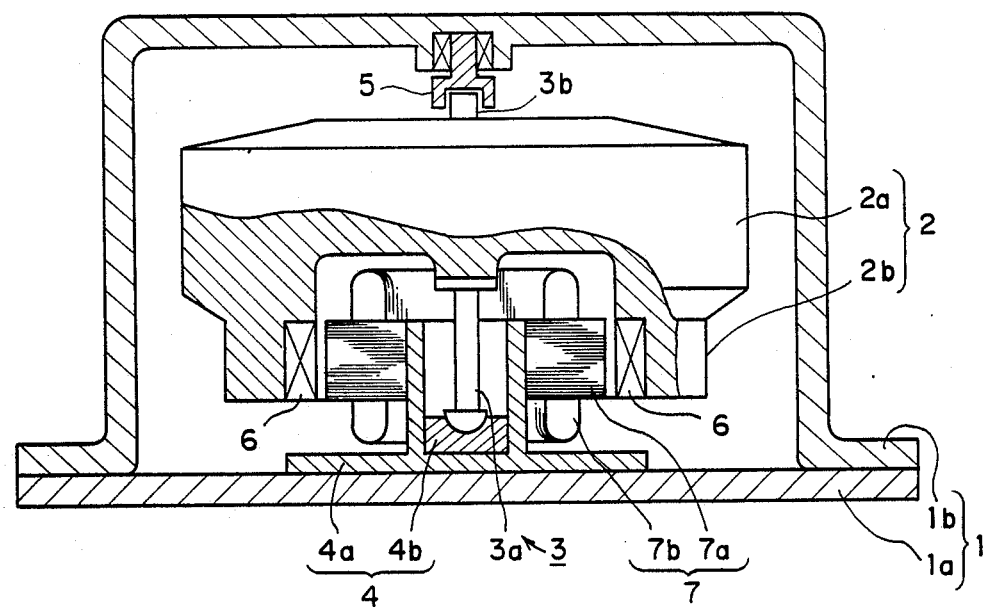
FIG. 1 is a schematic sectional view showing a general flywheel device.
Figure 2:
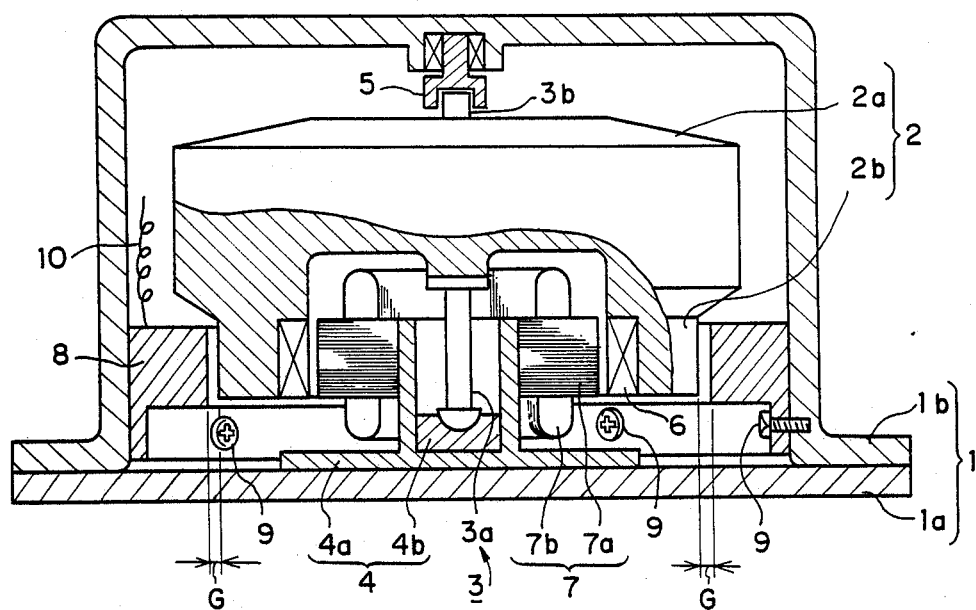
FIG. 2 is a schematic sectional view showing one example of a conventional flywheel device.
Figure 3:
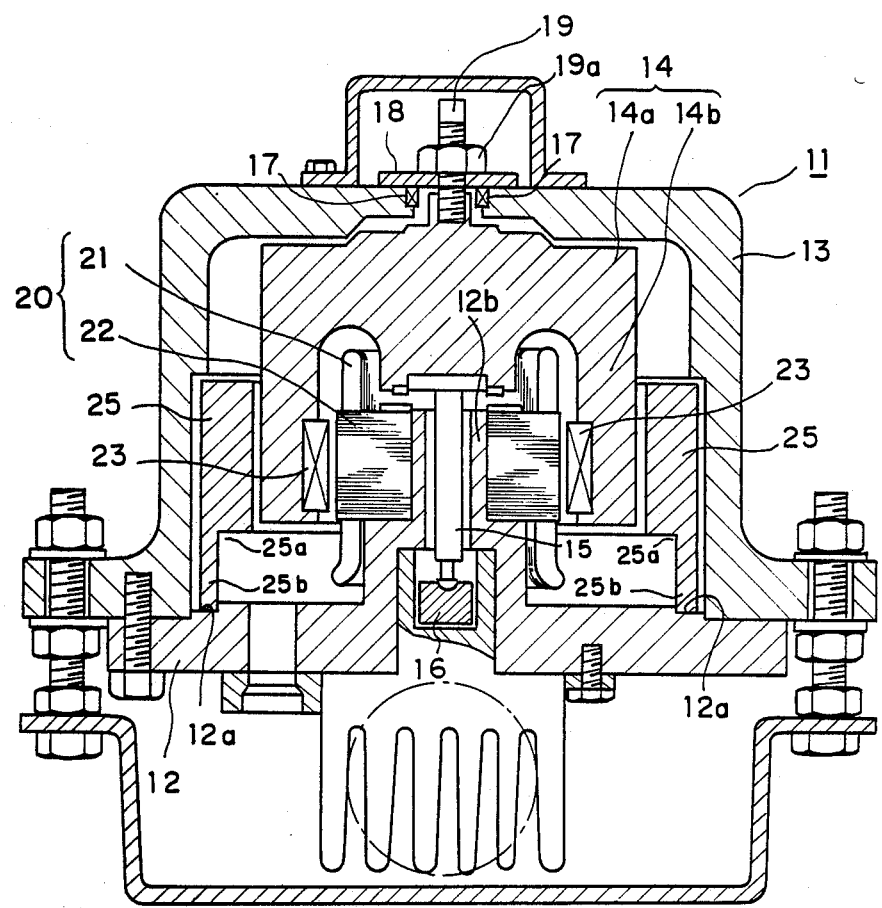
FIG. 3 is a schematic sectional view showing a first embodiment of a flywheel device according to the present invention.

FIG. 3 shows a first embodiment of the present invention. In FIG. 3, the flywheel device generally comprises a casing 11 comprising a frame base 12 and a cover 13, and a rotating body 14 rotatably supported within the casing 11. The rotating body 14 comprises a flywheel 14a at the upper side and a rotor 14b at the lower side as one body. A spiral shaft 15 having a lower spherical surface is supported on a lower bearing 16 integral with the frame base 12, and the upper side of the rotating body 14 is supported by a upper bearing 17. A disc 18 is attached to the cover 13 by means of a screw member 19 so as to fix the bearing 17. One end of the screw member 19 is screwed to the top of the flywheel 14a. The spiral shaft 15, the lower bearing 16 and the upper bearing 17 are protected from the shock during transportation of the flywheel device because the rotating body 14 is carried up and fixed to the disc 18 by a nut 19a. The screw member 19 and the nut 19a are removed from the flywheel 14a, and the rotating body 14 is rotated when the flywheel device is normally operated. To the outer periphery of a central projecting portion 12b of the frame base 12 is secured a stator 20 comprising a stator coil 21 and a core 22, and to the inner periphery of the rotor 14b corresponding to the stator 20 is secured a rotor magnet 23.

A complete seal is provided between the frame base 12 and the cover 13, and the interior of the casing 11 is in a state of vacuum. In the outer peripheral side of the rotor 14b of the rotating body 14 encased within the vacuum casing 11, a protective ring 25 is provided spaced apart from both the outer periphery of the rotary 14b and the inner periphery of the cover 13. The protective ring 25 has a lower side in the form of a portion of reduced thickness 25b through a shoulder 25a, the portion 25b being movably loosely fitted in a fitting surface or shoulder 12a of the frame base 12.

The operation of the above-described construction will be described. In the normal operation, when power is supplied to the coil 21 in the stator 20, the rotor 14b begins rotating about the shaft 15 by the electromagnetic action of the rotor magnet 23 and the stator 20, and the rotating body 14 rotates at a high speed on the bearing 16.

Next, when an abnormal condition occurs and the rotor 14b further rotates at an abnormally high speed due to malfunctions of, for example, a controller (not shown), the rotor 14b receives a centrifugal force above a stress limit point and spreads toward the outer periphery side. This spreading causes the outer peripheral surface of the rotor 14b to contact the inner peripheral surface of the protective ring 25 in a state wherein the rotor 14b keeps rotating and the rotating energy of the rotor 14b is absorbed by sliding frictional resistance to impart a braking force to the rotor 14b. When the turning force of the rotor 14b cannot be sufficiently restrained by the braking force, the rotor 14b is finally broken, and broken pieces therefrom are scattered in a tangential direction.

In the illustrated embodiment, the scattered broken pieces of the rotor 14b contact and impinge upon the protective ring 25 arranged in the outer periphery thereof. Since the protective ring 25 is formed of a material having an excellent elongating property, the protective ring 25 is subjected to plastic deformation by a gap portion relative to the inner peripheral surface of the cover 13 to absorb scattered energies of the rotor 14b. Moreover, since the protective ring 25 is rotatably loosely fitted in the fitting surface 12a of the frame base 12, when the scattered broken pieces of the rotor 14b contact or impinge upon the inner peripheral surface of the protective ring 25 from the tangential direction of the outer periphery of the rotor, the latter follows the turning force of the rotor and rotates, by which rotation the scattered energy of the rotor may be absorbed. The absorption of the scattered energy in this embodiment is quickly effected immediately after the breakage and scattering of the rotor 14b momentarily produced. Therefore, rapid and positive operation may be expected as compared with the conventional control which effects controlling operation from the detection by the temperature sensor.

Figure 4:
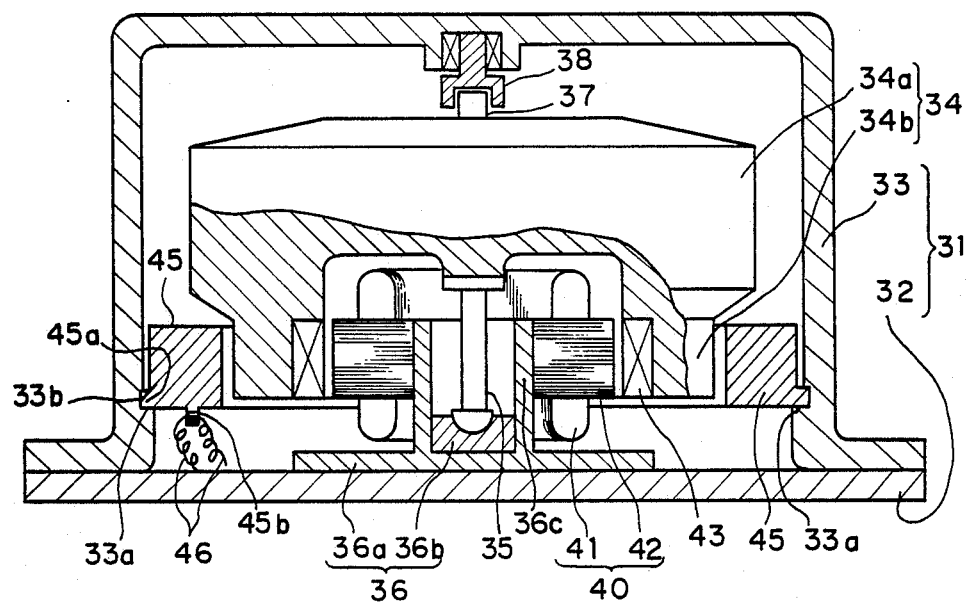
FIG. 4 is a schematic sectional view showing a second embodiment of the flywheel device according to the present invention.
Figure 5:
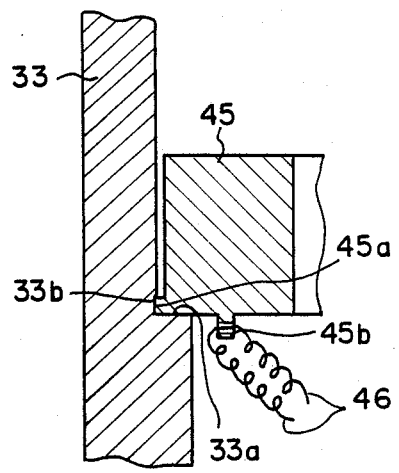
FIGS. 5 and 6 are a sectional view showing essential parts on an enlarged scale and a fragmentary plan view, respectively, of the embodiment shown in FIG. 4.
Figure 6:
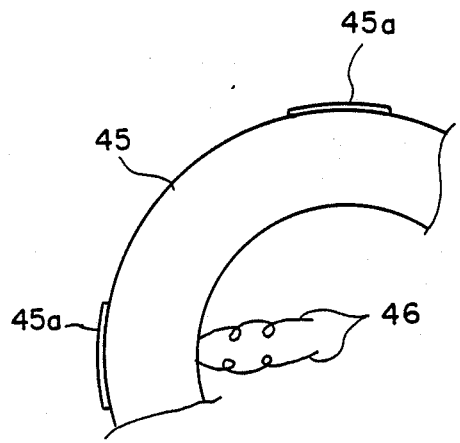

Next, a second embodiment of the present invention will be described with reference to FIGS. 4 to 6. In FIG. 4, a flywheel device is generally composed of a casing 31 comprising a frame base 32 and a cover 33 arranged in an integral relation, and a rotating body 34 supported within the casing 31 so that the rotating body may be rotated at a high speed. The rotating body 34 consists of a flywheel 34a at the upper side and a rotor 34b at the lower side. A spiral shaft 35 supporting the rotating body 34 is supported by a lower bearing 36 comprising a stationary portion 36a secured to a frame base 32 and a bearing portion 36b within the stationary portion 36a, and an upper rotating shaft 37 is supported by an upper bearing 38 mounted on the top plate of the cover 33.

To the outer peripheral surface of an upwardly extending portion 36c is secured a stator 40 comprising a coil 41 and a core 42, and to the inner peripheral surface of the rotor 34b opposed to the coil 41 is secured a rotor magnet 43.

A protective ring 45 is provided on a portion opposed to the rotor 34b on the inner peripheral surface of the cover 33 of the casing 31. The protective ring 45 is supported on a shoulder 33a peripherally provided on the inner peripheral surface of the cover 33. A plurality of projections 45a . . . as shown in FIGS. 5 and 6 are formed at the lower side in the outer periphery of the protective ring 45. These projections 45a are secured by a predetermined fastening force to an adhesive portion 33b of the inner wall of the cover 33 as shown in FIG. 5, and are normally in a temporarily secured state. A mounting portion 45b is provided at a suitable place on the protective ring 45. An abnormal-condition detecting sensor 46 composed of a lead wire or the like is mounted on the mounting portion 45b. Both ends of the sensor 46 are connected to a controller or the like (not shown) so that when an abnormal condition occurs, that is, when it is cut off as the protective ring follows and rotates, a supply of a power source input is stopped by a command from the controller.

The operation of the above-described construction will be described. First, the device as an electric motor during normal operation is similar to that of the first embodiment. Where the rotor 34b rotates at an abnormally high speed and a centrifugal force above a stress limit point is applied to the rotating body 34, the protective ring 45 is engaged by the inner peripheral surface of the cover 33 and maintains its temporarily secured state till rotating energy above the fastening force of the adhesive portion 33b acts from the rotating body 34 to the protective ring 45. When the acting force thereabove is applied to the protective ring 45, the protective ring 45 follows the rotating body 34 and rotates, and when the lead wire of the sensor 46 is cut off, supply of power is stopped by a command of the unshown controller. Furthermore, in case where an abnormal high-speed rotation of the rotating body 34 rapidly occurs and an abnormal condition such as spreading of the rotor 34b, contact, breakage and scattering thereof occurs, the protective ring 45 rotates along with the rotating body 34 to prevent scattered broken pieces of the rotor 34b from direct contact with an impingement on the cover 33, the stator base 32 and the like.

Figure 7:
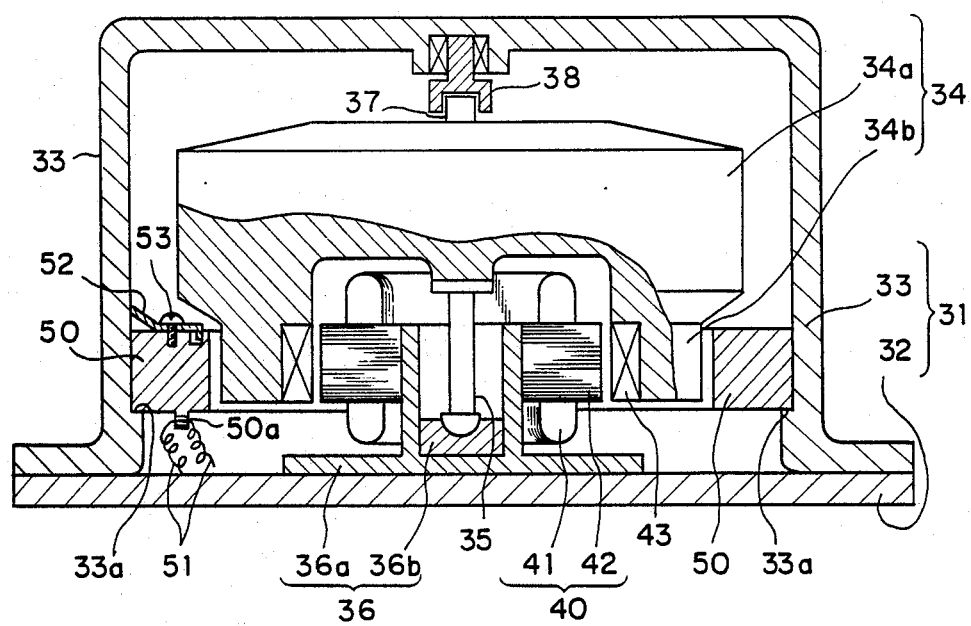
FIG. 7 is a schematic sectional view showing a third embodiment of the flywheel device according to the present invention.
Figure 8:
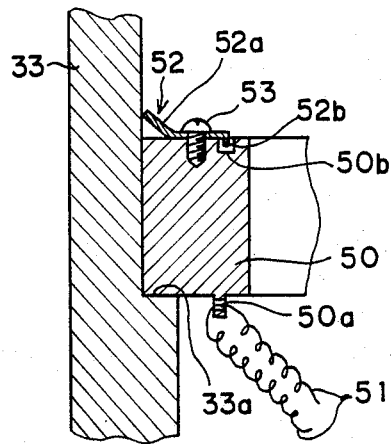
FIGS. 8 and 9 are a sectional view of essential parts on an enlarged scale and an enlarged perspective view of a locking (engaging) member, respectively, in the embodiment shown in FIG. 7.
Figure 9:
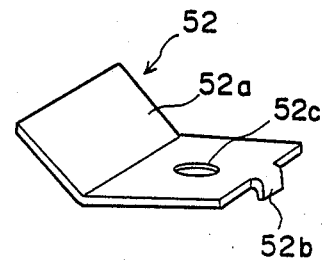

FIGS. 7 to 9 show a third embodiment of the present invention. In these figures, numerals 31 through 38 and 40 through 43 designate the same parts as those of the device shown in the second embodiment described in connection with FIG. 4.

A shoulder 33a formed on the inner peripheral surface of the cover 33 of the casing 31 supports the protective ring 50 which follows the rotating body 34 and rotates. A mounting portion 50a is formed at a suitable place on the protective ring 50, and an abnormal-condition detecting sensor 51 such as a lead wire is mounted on the mounting portion 50a. A plate spring 52 as an engaging member for bringing the protective ring 50 into engagement with the inner peripheral surface of the cover 33 is secured by means on a screw 53 to a suitable place of the upper surface of the protective ring 50. The plate spring 52 is formed with a spring piece 52a held in abutment with the inner peripheral surface of the cover 33 by a resilient force and a pawl 52b in engagement with an angle hole portion 50b of the protective ring 50, and a slot 52c for receiving the screw 53. The movement of the plate spring 52 toward the inner peripheral side of the protective ring 50 is defined by engagement between the pawl 52b and the hole 50b. When the spring piece 52a comes into abutment with the inner peripheral surface of the cover 33 by the resilient force, the plate spring 52 and the protective ring 50 do not rotate, if the sliding contact force of the rotor 34b is not great, but are temporarily secured to the inner peripheral surface of the cover 33. It is noted that one or more plate springs 52 may be mounted on the protective ring 50.

Figure 10:
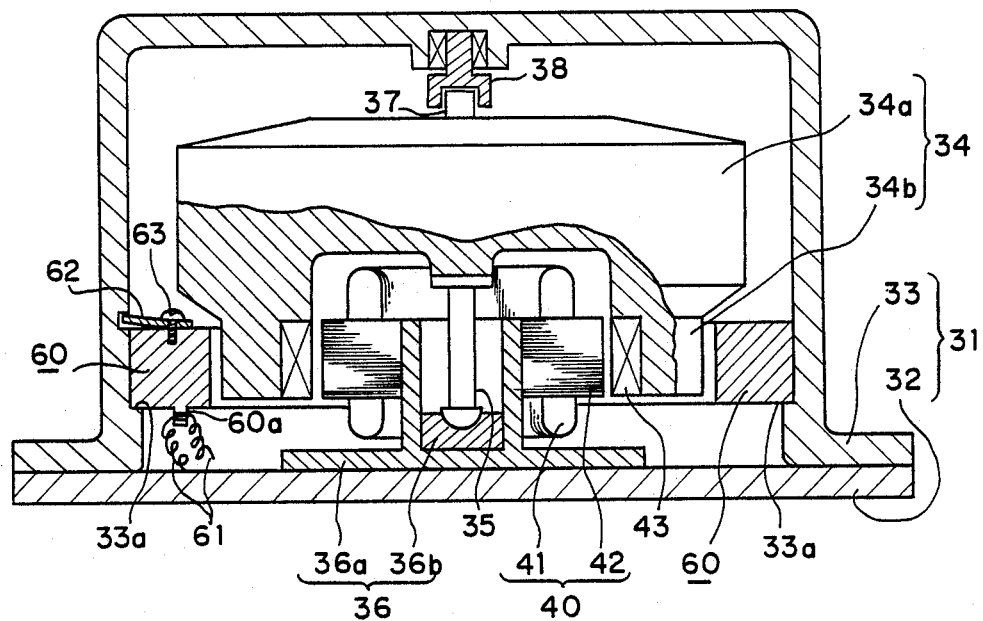
FIG. 10 is a schematic sectional view showing a fourth embodiment of the flywheel according to the present invention.
Figure 11:
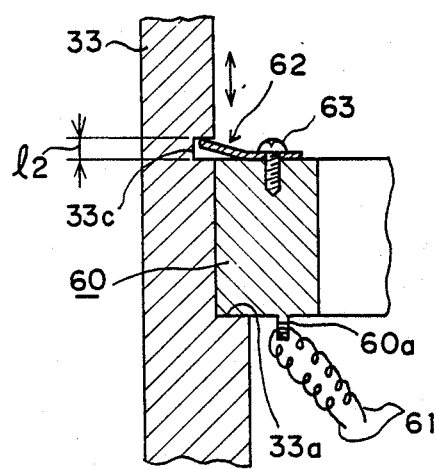
FIGS. 11 and 12 are a sectional view of essential parts on an enlarged scale and an enlarged perspective view of a locking (engaging) member in the embodiment shown in FIG. 10.
Figure 12:
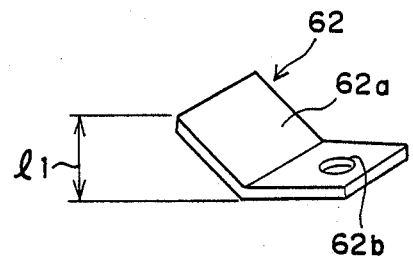

A fourth embodiment of the present invention will be described with reference to FIGS. 10 to 12. In FIG. 10, numerals 31 to 38 and 40 to 43 designate the same parts as those of the second and third embodiments of FIGS. 4 and 7, respectively.

A protective ring 60 is supported on a shoulder 33a of a cover 33. An abnormal-condition detecting sensor 61 such as a lead wire is mounted on a mounting portion 60a formed on the lower end of the protective ring 60. To a suitable place of the upper surface of the protective ring 60 is secured a plate spring 62 by means of a screw 63. The plate spring 62 has a spring piece 62a gently bent toward one surface as shown in FIG. 12 and a hole 62b for threadedly receiving the screw 63. The bending amount of the spring piece 62a is indicated by the length l1. The cover 33 is formed at the inner peripheral surface with a groove 33c engaged by the spring piece 62a. The height of the groove 33c is indicated by the length l2, which is smaller than the length l1, the bending amount of the spring piece 62a is. Accordingly, the spring piece 62a normally biased by the groove 33c in the state where the protective ring 60 is mounted, and the protective ring 60 is engaged with the inner peripheral surface of the cover 33 by said biasing force. The protective ring 60 follows and rotates only responsive to the action of the abnormal external force above a predetermined force as in the case where for example, the rotor 34b is broken and scattered, to absorb the rotor breaking energy as described.

Also in this embodiment, a single flat spring 62 may be provided or a plurality of springs 62 may be provided in spaced relation. The engaging force of the protective ring 60 with respect to the inner peripheral surface of the cover 33 may be adjusted depending on the bending amount, material, thickness and number of the plate spring 62.

As above described in detail, according to the flywheel power source device of the present invention, a protective ring for preventing a direct damage to a casing resulting from an abnormally high speed rotation of a rotor is rotatably configured, a turning force of the rotor is relieved by the rotatable protective ring, and even in case of breakage, scattering and the like of the rotor which is the worst state, scattering broken pieces of the rotor as a result of receiving a converting force in a tangential direction of the outer periphery of the rotor may be absorbed by the turning force thereof to positively and effectively protect the casing.

Moreover, abnormal-condition data which forms basic data in order that the controller may release a command to stop supply of power is detected not by temperature information from a temperature sensor or the like but by a simple abnormal-condition sensor, which for example, detects whether the wire is broken. Therefore, the device is simple in construction, and can provide a quick responsive abnormal-condition detection. As a further effect, the simplification of a the entire device and the realization of rapid failsafe function may be provided.

What is claimed is:

1. A flywheel device comprising
   a casing including a cover having an opening therein and a frame base closing said opening, said cover having an inner circumferential wall;
   a stator supported on said frame base;
   a rotating body rotatably supported within said casing, said rotating body comprising a rotor and a flywheel mounted integrally with said rotor, said rotating body being rotatable at a high speed by electromagnetic action with said stator and accumulating rotating energies which can be converted into electric energies; and
   a protective ring disposed between said inner circumferential wall of said casing and the outer periphery of said rotor and spaced from said rotor during normal operation of the flywheel device, said rotor expanding centrifugally upon the occurrence of an abnormally high speed of said rotating body to engage said protective ring;
   said protective ring being free to rotate relative to said casing whereby upon engagement of said protective ring by said rotor under abnormally high speed said protective ring rotates with said rotor to increase the rotating mass and act as a braking force.

2. The flywheel device as set forth in claim 1, wherein said protective ring is formed of a material having an elongating property.

3. The flywheel device as set forth in claim 1, wherein a gap is provided between said inner circumferential wall of said cover and the outer peripheral wall of said protective ring in order to absorb shock when abnormally high-speed rotation of the rotor causes the outer peripheral wall of said rotor to expand into contact with said protective ring.

4. The flywheel device as set forth in claim 1 wherein said frame base has a shoulder formed on the inner surface thereof and said protective ring includes a portion abutting said inner surface of said frame base and engaging said shoulder in a loosely fitted relationship whereby said protective ring may rotate relative to said frame base when said protective ring is engaged by said rotor upon occurrence of an abnormally high speed.

5. The flywheel device as set forth in claim 4, wherein said casing includes said frame base and said portion of said protective ring abutting said frame base is formed of reduced thickness, said portion of reduced thickness engaging said shoulder on said frame base, said portion of reduced thickness being flexible in order to dampen the shock caused by engagement of said rotor with said protective ring.

6. A flywheel device comprising a casing including a cover having an opening therein and a frame base closing said opening, said cover having an inner circumferential wall;
   a stator supported on said frame base;
   a rotating body rotatably supported within said casing, said rotating body comprising a rotor and a flywheel mounted integrally with said rotor, said rotating body being rotatable at a high speed by electromagnetic action with said stator and accumulating rotating energies which can be converted into electric energies; and
   a protective ring disposed between said inner circumferential wall of said cover and the outer peripheral surface of said rotor inner circumferential wall of said cover until engagement of said outer peripheral surface of said rotor with said protective ring responsive to an abnormally high speed rotation of said rotor assumes a predetermined force, said protective ring being free to rotate with said rotor relative to said cover when the force exerted on said protective ring by said rotor exceeds said predetermined force, said protective ring being then rotated.

7. The flywheel device as set forth in claim 6, wherein an abutment portion projecting in a direction of said peripheral inner wall surface of said casing is provided on a part of the outer peripheral surface of said protective ring, said protective ring is firmly fitted in said peripheral inner wall surface of the casing by said abutment portion, and a gap is provided between said peripheral inner wall surface of said casing and said outer peripheral surface of said protective ring except at said abutment portion.

8. The flywheel device as defined in claim 6, wherein said protective ring is provided with an abnormal-condition detecting sensor for detecting an abnormal condition within the casing by being cut due to the rotation of said protective ring resulting from the abutment and impingement of the outer peripheral surface of the rotor responsive to the abnormally high speed rotation of said rotor.

9. The flywheel device as defined in claim 6, wherein said protective ring is supported by a support portion provided on said peripheral inner wall surface of said casing, an engaging means is provided to check the rotation of the protective ring till a turning force in excess of a predetermined value is applied to said protective ring.

10. The flywheel device as defined in claim 9, wherein said support portion is composed of a shoulder formed on said peripheral inner wall surface of said casing.

11. The flywheel device as set forth in claim 9, wherein said engaging means comprises a plate spring secured to the upper surface of said protective ring, and said protective ring is engaged by said inner peripheral surface of said casing by the resilient force of said plate spring till the protective ring is rotated by the influence of the abutment and impingement of the outer peripheral surface of the rotor responsive to the abnormally high speed rotation of said rotor.

12. The flywheel device as set forth in claim 11, wherein a pawl is formed on said plate spring, and an engaging groove engaged by said pawl is formed in the upper surface of said protective ring.

13. The flywheel device as set forth in claim 9, wherein said engaging means comprises a plate spring secured to the upper surface of said protective ring, and an engaging groove formed at a position opposed to said peripheral inner wall surface of said casing so that the end of the plate spring is resiliently urged against said peripheral inner wall surface.

14. The flywheel device as set forth in claim 11 or 13, wherein said protective ring is provided on the lower end surface thereof with an abnormal-condition detecting sensor for detecting an abnormal condition of the interior of the casing by being cut due to the rotation of the said protective ring resulting from the abutment and impingement of the outer peripheral surface of the rotor responsive to the abnormally high speed rotation of said rotor.

15. The flywheel device as set forth in either of claim 11 or 13, wherein a plurality of said plate springs are arranged on the upper surface of the protective ring in spaced apart relation.

16. The flywheel device as set forth in either of claim 11 or 13, wherein a single plate spring is provided at a suitable location on the upper surface of the protective ring.

* * * * *

UNITED STATES PATENT AND TRADEMARK OFFICE
CERTIFICATE OF CORRECTION

PATENT NO. : 4,819,502

DATED : April 11, 1989

INVENTOR(S) : TOSHIO NAKAJIMA ET AL.

It is certified that error appears in the above-identified patent and that said Letters Patent is hereby corrected as shown below:

Col. 1, line 26, "20" should be --2--;
Col. 1, line 28, "pper" should be --upper--;
Col. 1, line 42, "WIth" should be --With--;
Col. 1, line 63, "malfunctions" should be --malfunction--.

Col. 2, line 7, "periheral" should be --peripheral--;
Col. 2, line 18, "malfunctions" should be --malfunction--.

Col. 4, line 25-26, "rotary" should be --rotor--;
Col. 4, line 40, "malfunctions" should be --malfunction--.

Col. 6, line 50, "11" should be --$\ell 1$--;
Col. 6, line 53, "12" should be --$\ell 2$--;
Col. 6, line 54, "11" should be --$\ell 1$--;
Col. 6, line 55, after "62a" insert --is--.

Signed and Sealed this

Fourth Day of September, 1990

Attest:

HARRY F. MANBECK, JR.

Attesting Officer

Commissioner of Patents and Trademarks